US007426544B2

(12) United States Patent
Bhogal et al.

(10) Patent No.: US 7,426,544 B2
(45) Date of Patent: Sep. 16, 2008

(54) METHOD AND APPARATUS FOR LOCAL IP ADDRESS TRANSLATION

(75) Inventors: Kulvir Singh Bhogal, Fort Worth, TX (US); Nizamudeen Ishmael, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/688,676

(22) Filed: Mar. 20, 2007

(65) Prior Publication Data
US 2007/0174475 A1    Jul. 26, 2007

Related U.S. Application Data

(62) Division of application No. 10/355,683, filed on Jan. 30, 2003, now Pat. No. 7,254,642.

(51) Int. Cl.
*G06F 15/16* (2006.01)

(52) U.S. Cl. .................. 709/217; 709/203; 709/220; 709/226; 709/245

(58) Field of Classification Search ................ 709/203, 709/217, 220, 226, 245
See application file for complete search history.

(56) References Cited

U.S. PATENT DOCUMENTS 6,014,660 A    1/2000   Lim et al.

(Continued)

FOREIGN PATENT DOCUMENTS

JP           11340984        12/1999

(Continued)

OTHER PUBLICATIONS

Mockapetris, "Domain Names—Implementation and Specification",RFC 1035, 1987 (updated 1996), pp. 1-40, http://www.ietf.org/rfc/rfc1035.txt.

(Continued)

*Primary Examiner*—Michael Won
(74) *Attorney, Agent, or Firm*—Duke W. Yee; Marilyn S. Dawkins; Brandon G. Williams

(57) ABSTRACT

A method, apparatus, and computer instructions for requesting a page from a server across a network data processing system. The page is requested a first time from a client application in the data processing system in which the page is requested using a domain name. An Internet Protocol address for the domain name is looked up for the page on a remote domain name server. The Internet Protocol address is used to request the page. The Internet Protocol address is stored locally in the data processing system in a database of Internet Protocol translations in association with the domain name for the page and wherein the database is accessible only by the client application. As a result, subsequent requests for the page may be processed using this database. The database of Internet Protocol translations is referenced to determine whether an Internet Protocol address for a selected page is present in response to a request for the selected page. The selected page is requested using an Internet Protocol address returned from the database of Internet Protocol translations if the Internet Protocol address is present in the database of Internet Protocol translations. The remote domain name server is queried to determine the Internet Protocol address of the selected page if the Internet Protocol address for the selected page cannot be determined from referencing the database of Internet Protocol translations.

10 Claims, 3 Drawing Sheets

U.S. PATENT DOCUMENTS

| | | | |
|---|---|---|---|
| 6,016,512 A | 1/2000 | Huitema | |
| 6,081,840 A | 6/2000 | Zhao | |
| 6,138,122 A | 10/2000 | Smith et al. | |
| 6,178,160 B1 | 1/2001 | Bolton et al. | |
| 6,195,691 B1 | 2/2001 | Brown | |
| 6,205,477 B1 | 3/2001 | Johnson et al. | |
| 6,205,481 B1 | 3/2001 | Heddaya et al. | |
| 6,262,987 B1 | 7/2001 | Mogul | |
| 6,286,092 B1 | 9/2001 | Frank et al. | |
| 6,304,913 B1 | 10/2001 | Rune | |
| 6,314,469 B1 * | 11/2001 | Tan et al. | 709/245 |
| 6,415,281 B1 | 7/2002 | Anderson | |
| 6,427,170 B1 * | 7/2002 | Sitaraman et al. | 709/226 |
| 6,553,413 B1 | 4/2003 | Leighton et al. | |
| 6,647,415 B1 | 11/2003 | Olarig et al. | |
| 6,775,695 B1 | 8/2004 | Sarukkai | |
| 6,959,333 B2 * | 10/2005 | Beaumont et al. | 709/223 |
| 7,043,563 B2 * | 5/2006 | Vange et al. | 709/245 |
| 7,254,642 B2 * | 8/2007 | Bhogal et al. | 709/245 |
| 2002/0002622 A1 * | 1/2002 | Vange et al. | 709/245 |
| 2002/0101836 A1 | 8/2002 | Dorenbosch | |
| 2002/0133572 A1 | 9/2002 | Haulund et al. | |
| 2007/0233780 A1 * | 10/2007 | Shevlin et al. | 709/203 |

FOREIGN PATENT DOCUMENTS

| | | |
|---|---|---|
| WO | 0027092 | 5/2000 |

OTHER PUBLICATIONS

Li et al., "Combined Coherence and Prefetching Mechanisms for Effective Web Caching", 2001, IEEE, pp. 3034-3038.

Chandranmenon et al., "Reducing Web latency using Reference Point Caching", 2001, IEEE, IEEE Infocom 2001, pp. 1607-1616.

* cited by examiner

METHOD AND APPARATUS FOR LOCAL IP ADDRESS TRANSLATION

This application is a divisional of application Ser. No. 10/355,683, filed Jan. 30, 2003, now U.S. Pat. No. 7,254,642, which is herein incorporated by reference.

BACKGROUND OF THE INVENTION

1. Technical Field

The present invention relates generally to an improved data processing system and in particular to a method and apparatus for locating data. Still more particularly, the present invention provides a method and apparatus for locating documents using an improved domain name system.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL.

A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database. A significant amount of time used in traversing the Web involves time spent trying to translate domain names into IP addresses. Such a process can be time consuming because DNS tables must be looked up on DNS servers. Such a process is especially time consuming when a dial up connection is used.

Therefore, the present invention provides an improved method, apparatus, and computer instructions for providing domain name system translations that reduce the time consuming process of obtaining domain name system translations from DNS servers.

SUMMARY OF THE INVENTION

The present invention provides a method, apparatus, and computer instructions for requesting a page from a server across a network data processing system. The page is requested a first time from a client application in the data processing system in which the page is requested using a domain name. An Internet Protocol address for the domain name is looked up for the page on a remote domain name server. The Internet Protocol address is used to request the page. The Internet Protocol address is stored locally in the data processing system in a database of Internet Protocol translations in association with the domain name for the page and wherein the database is accessible only by the client application. As a result, subsequent requests for the page may be processed using this database. The database of Internet Protocol translations is referenced to determine whether an Internet Protocol address for a selected page is present in response to a request for the selected page. The selected page is requested using an Internet Protocol address returned from the database of Internet Protocol translations if the Internet Protocol address is present in the database of Internet Protocol translations. The remote domain name server is queried to determine the Internet Protocol address of the selected page if the Internet Protocol address for the selected page cannot be determined from referencing the database of Internet Protocol translations.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
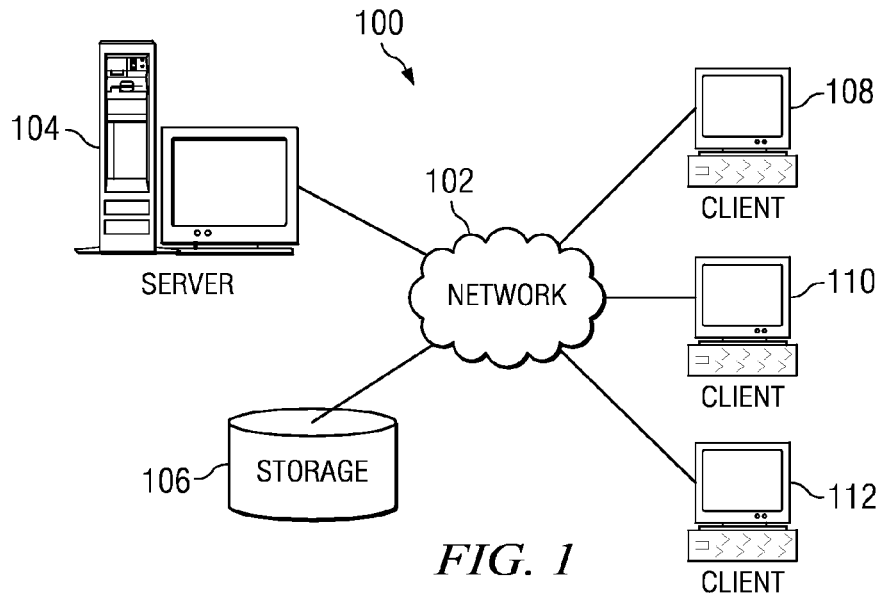
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. In these examples, server 104 may be a DNS server and provide translations of domain names into IP addresses for clients 108, 110, and 112. When acting as a DNS server, server 104 maintains a database of domain names (host names) and their corresponding IP addresses. For example, if www.company.com were presented to a DNS server, the IP address 214.26.68.51 would be returned to the client. Network data processing system 100 may include additional servers, clients, and other devices not shown.

The present invention provides an improved method, apparatus, and computer instructions for translating domain names into IP addresses by providing a local translation mechanism to the client. This mechanism provides an advantage in reducing the amount of time spent obtaining IP address translations from a DNS server, such as server 104.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
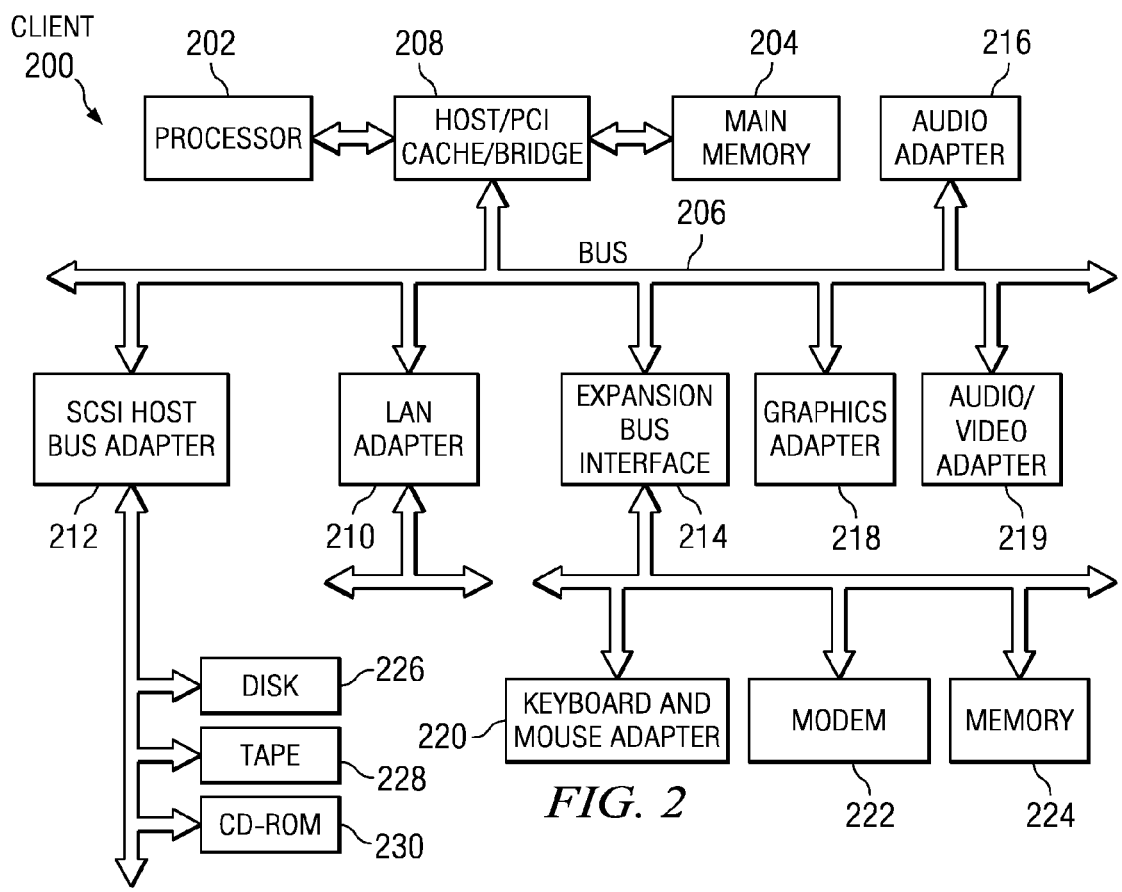
FIG. 2 is a block diagram illustrating a data processing system in which the present invention may be implemented.

With reference now to FIG. 2, a block diagram illustrating a data processing system is depicted in which the present invention may be implemented. Data processing system 200 is an example of a client computer, such as client 108 in FIG. 1.

Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. Small computer system interface (SCSI) host bus adapter 212 provides a connection for hard disk drive 226, tape drive 228, and CD-ROM drive 230.

An operating system runs on processor 202 and is used to coordinate and provide control of various components within data processing system 200 in FIG. 2. The operating system may be a commercially available operating system, such as Windows XP, which is available from Microsoft Corporation. An object oriented programming system such as Java may run in conjunction with the operating system and provide calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

As another example, data processing system 200 may be a stand-alone system configured to be bootable without relying on some type of network communication interfaces As a further example, data processing system 200 may be a personal digital assistant (PDA) device, which is configured with ROM and/or flash ROM in order to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

Figure 3:
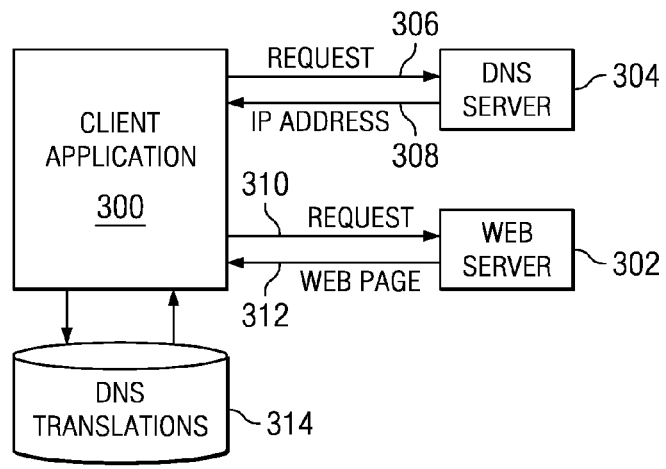
FIG. 3 is a diagram illustrating components used in providing local IP address translations in accordance with a preferred embodiment of the present invention.

Turning next to FIG. 3, a diagram illustrating components used in providing local IP address translations is depicted in accordance with a preferred embodiment of the present invention. Client application 300 executes on a client, such as data processing system 200 in FIG. 2, and may request a page from a Web server, such as Web server 302. Web server 302 is located on another data processing system, such as a server. Typically, a domain name is entered. Therefore, the domain name must be translated into an IP address using domain name server (DNS) 304, which is located on another data processing system.

In this example, client application 300 is a browser, but may be any application that requests data across a network using domain names and IP addresses. The domain name is sent to DNS server 304 across a network, such as network 102 in FIG. 1, in request 306. DNS server 304 contains tables for translating the domain name in request 306 into an IP address. As a result, IP address 308 is returned to client application 300. Request 310 is generated and sent to Web server 302 using IP address 308. As a result, Web server 302 returns Web page 312 to client application 300.

Each time a new domain is translated into an IP address by DNS server 304, client application 300 locally saves the IP address in association with the domain name in DNS translations database 314. This database is located locally in the data processing system in which client application 300 is located. In these examples, this database is only accessible by client applications. Of course, any data structure, such as a table, may be used to store these translations for use. In this manner, the next time the same page or domain name is requested, client application 300 may query DNS translations database 314 to determine whether the IP address is present. By performing this IP address translation locally rather than querying DNS server 304, time may be saved with respect to the time needed to send the request and receive a result from DNS server 304. Such an advantage is especially evident with respect to dial up connections.

Further, depending on the particular implementation, a user may specify that selected domain names are never stored or looked for in DNS translations database 314. For example, if the user performs a shift reload command, the local IP address translation may be skipped and the normal process of loading a page using remote DNS server 304 may be employed. Certain domain names or pages may be skipped for various reasons. For example, an IP address for a domain name may be dynamic, changing from time to time. In this case, using a local database to identify the IP address is undesirable. Further, client application 300 may check to see if the IP address for the domain name has been updated. If such an update has occurred, the appropriate translation in DNS translations database 314 may be updated.

Further, Web server 302 could automatically send a new IP address to client application 300 when such a change occurs. This new IP address would be automatically updated in DNS translations database 314. In these examples, the updates to DNS translations database 314 are made by client applications, such as client application 300. Applications other than client applications are not allowed to access or update this database in the depicted examples.

Additionally, updates to DNS translations database 314 may be performed automatically at off-peak or off-use times. In such an update, client application 300 would query DNS server 304 for IP addresses of all of the domain names stored in DNS translations database 314. Changes in IP addresses for domain names stored in DNS translations database 314 may be automatically updated when a comparison is made between the current IP address stored in DNS translations database 314 and the IP address returned by DNS server 304.

Figure 4:
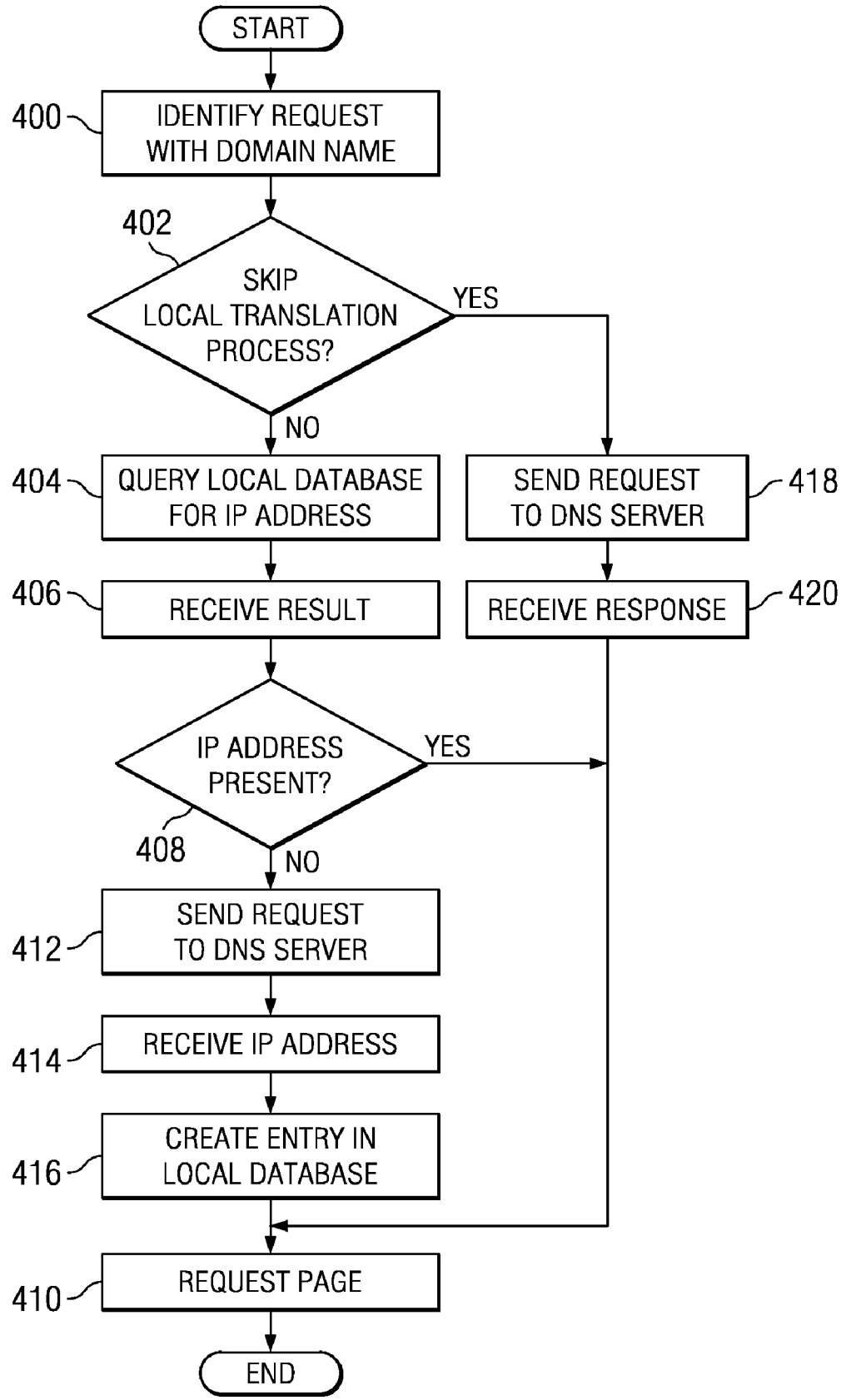
FIG. 4 is a flowchart of a process used for translating domain names in accordance with a preferred embodiment of the present invention.

With reference now to FIG. 4, a flowchart of a process used for translating domain names is depicted in accordance with a preferred embodiment of the present invention. The process illustrated in FIG. 4 may be implemented in a client process, such as client application 300 in FIG. 3.

The process begins by identifying a request with a domain name (step 400). A determination is made as to whether the local translation process is to be skipped (step 402). The local translation process may be skipped if some selected user input, such as a shift reload command, is received. If the local translation process is not to be skipped, the local database is queried for an IP address (step 404). Local translation processes may be skipped in some situations, such as for sites known to have dynamic IP addresses. The local database is a database, such as DNS translations database 314 in FIG. 3. Of course, other types of data structures may be used and queried. These data structures may include, for example, a table or a linked list. The result is received from the local database (step 406). A determination is made as to whether the IP address is present in the result. If the IP address is present in the result, the page is requested using the returned IP address (step 410) and the process terminates thereafter.

Referring again to step 408, if the IP address is not present in the result, the request is sent to the DNS server (step 412). A result containing the IP address is received from the DNS server (step 414). Thereafter, an entry is created in the local database (step 416) and the process proceeds to step 410 as described above. With reference again to step 402, if the local translation process is to be skipped, a request is sent to the DNS server (step 418). A response is received (step 420) and the process terminates thereafter. With respect to step 418, if the domain name is already present in the local database, the IP address received in step 418 may be compared to the IP address for the domain name in the local database. If a new IP address is present, an update may be made in the local database.

Figure 5:
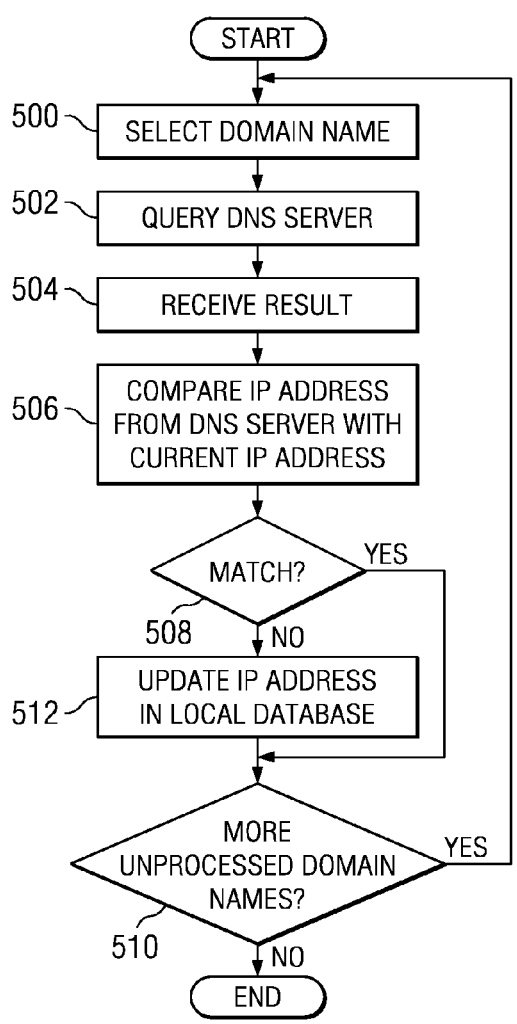
FIG. 5 is a flowchart of a process used for updating a domain name translation database in accordance with a preferred embodiment of the present invention.

Turning now to FIG. 5, a flowchart of a process used for updating a domain name translation database is depicted in accordance with a preferred embodiment of the present invention. The process illustrated in FIG. 5 may be implemented in a client process, such as client application 300 in FIG. 3. In these illustrations, the client application performs the update to the domain name translation database.

The process begins by selecting a domain name from the local database (step 500). The DNS server is queried for an IP address using the selected domain name (step 502). A result is returned by the DNS server (step 504). The IP address in the result from the DNS server is compared with the current IP address in the local IP database (step 506). A determination is made as to whether a match between the IP addresses is present (step 508). If a match is present, a determination is made as to whether additional unprocessed domain names remain in the local database (step 510). If additional unprocessed domain names are present in the local database, the process returns to step 500. Otherwise, the process terminates.

Turning back to step 508, if a match is absent between the IP address returned from the DNS server and the current IP address in the local database, the IP address in the local database is updated with the new IP address (step 512) with the process then proceeding to step 510 as described above. The process illustrated in FIG. 5 may be performed at times in which traffic is low on the Internet. For example, this process may be performed at 1:00 a.m. in the morning. Additionally, this process is typically not performed while the user is actively using the data processing system.

Figure 6:
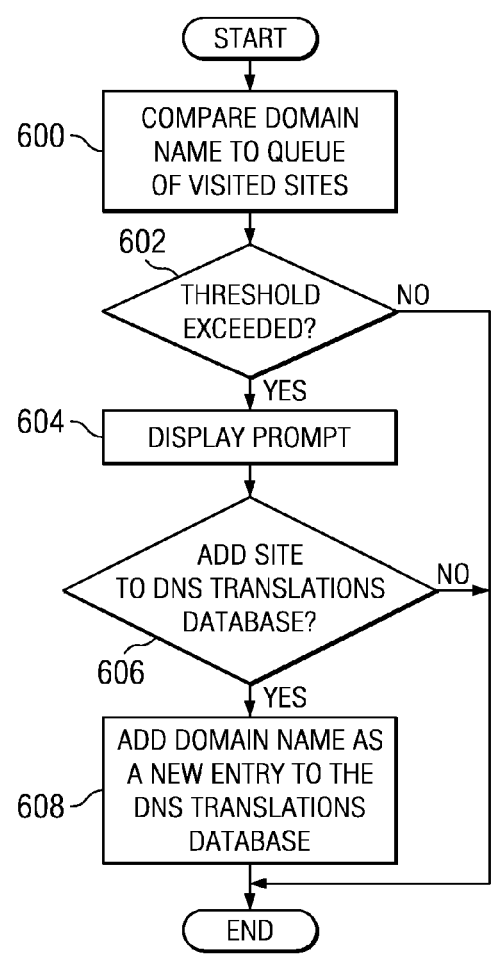
FIG. 6 is a flowchart of a process for selectively creating entries in a DNS translations database in accordance with a preferred embodiment of the present invention.

Turning next to FIG. 6, a flowchart of a process for selectively creating entries in a DNS translations database is depicted in accordance with a preferred embodiment of the present invention. The process illustrated in FIG. 6 is a more detailed description of an alternative step for creating an entry in a local database used to perform DNS translations. More specifically, the steps in FIG. 6 may be implemented in step 416 of FIG. 4.

The process begins by comparing the domain name sent in the request to the DNS server to a queue of visited sites (step 600). In this example, a queue of visited sites is maintained similar to a history that is maintained in a browser program. A number of visited sites, such as 500 entries, may be stored in the queue.

A determination is made as to whether the domain name of the site for which a DNS translation was requested has been visited more than some threshold level (step 602). The threshold may take various forms depending on the particular implementation. For example, the threshold may be set to be exceeded if a site is visited more than five times within some period of time, such as two days. Alternatively, the threshold may be exceeded if the site is visited ten times within any period of time. If this threshold is exceeded, a prompt is displayed to the user (step 604). This prompt may be a pop-up window stating: "You have visited this site five times in the last two days. Do you wish to add this site to a list of local translations?" This pop-up window also may include appropriate graphical controls to receive user inputs. A determination is made as to whether the user desires to add the site to the DNS translations database (step 606). If the user desires to add the site, the domain name for the site is added to the DNS translations database as a new entry for use in performing local domain name translations (step 608) with the process terminating thereafter.

Turning back to step 606, if the user does not wish to add the site to the DNS translations database, the process terminates. Further, the process also terminates if the threshold is not exceeded.

Thus, the present invention provides an improved method, apparatus, and computer instructions for locally translating domain names into IP addresses. When a Web page is requested using a domain name, a local domain name translation database is queried to see whether the IP address is present. If the IP address for the domain name is present, the Web page is then requested without having to contact or query a remote DNS server. If an IP address is not present for the domain name, the normal process of querying the DNS server is performed. The returned IP address and domain name are added as an entry in the database. In this manner, time may be saved by users traversing the Web by avoiding the time needed to query and receive an IP address for a domain name from a DNS server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for requesting a page from a server across a network data processing system, the method comprising:

requesting, by a client application in the data processing system, the page for a first time, wherein the page is requested using a domain name and wherein the step of requesting forms a first request;

looking up an Internet Protocol address for the domain name for the page on a remote domain name server;

using the Internet Protocol address to request the page;

storing the Internet Protocol address locally in the data processing system in a database of Internet Protocol translations when the page is requested for the first time, wherein the Internet Protocol address for the page is stored in association with the domain name for the page and wherein the database is accessible only by the client application and used by the client application in a subsequent request for the page;

responsive to a request for a selected page, referencing the database of Internet Protocol translations to determine whether an Internet Protocol address for a selected page is present;

requesting the selected page with the subsequent request, wherein the subsequent request uses an Internet Protocol address returned from the database of Internet Protocol translations if the Internet Protocol address is present in the database of Internet Protocol translations;

querying the remote domain name server to determine the Internet Protocol address of the selected page if the Internet Protocol address for the selected page cannot be determined from referencing the database of Internet Protocol translations; and performing the looking and using steps only if a selected user input is received, wherein the selected user input requests that a local translation process is skipped.

2. The method of claim 1 further comprising:

indicating in the database of Internet Protocol translations that certain Internet Protocol addresses of specified domain names are to be excluded from the database.

3. The method of claim 1 further comprising:

updating the database of Internet Protocol translations, by the client application, if a given Internet Protocol address for a given domain name has changed.

4. The method of claim 1 further comprising:

automatically receiving an updated Internet Protocol address for a given domain name if a given Internet Protocol address for the given domain name has changed.

5. A data processing system for requesting a page from a server across a network data processing system, the data processing system comprising:

a bus system;

a communications unit connected to the bus system;

a memory connected to the bus system, wherein the memory includes a set of instructions; and a processing unit connected to the bus system, wherein the processing unit executes the set of instructions to request, by a client application in the data processing system, the page for a first time, wherein the page is requested using a domain name and wherein the set of instructions to request forms a first request; look up an Internet Protocol address for the domain name for the page on a remote domain name server; use the Internet Protocol address to request the page; store the Internet Protocol address locally in the data processing system in a database of Internet Protocol translations when the page is requested for the first time, wherein the Internet Protocol address for the page is stored in association with the domain name for the page and wherein the database is accessible only by the client application and used by the client application in a subsequent request for the page; reference the database of Internet Protocol translations to determine whether an Internet Protocol address for a selected page is present in response to a request for a selected page; request the selected page with the subsequent request, wherein the subsequent request uses an Internet Protocol address returned from the database of Internet Protocol translations if the Internet Protocol address is present in the database of Internet Protocol translations; query the remote domain name server to determine the Internet Protocol address of the selected page if the Internet Protocol address for the selected page cannot be determined from referencing the database of Internet Protocol translations; and performs the look up and the using only if a selected user input is received, wherein the selected user input requests that a local translation process is skipped.

6. A data processing system for requesting a page from a server across a network data processing system, the data processing system comprising:

requesting means for requesting, by a client application in the data processing system, the page for a first time, wherein the page is requested using a domain name and wherein the means for requesting forms a first request;

looking means for looking up an Internet Protocol address for the domain name for the page on a remote domain name server;

using means for using the Internet Protocol address to request the page;

storing means for storing the Internet Protocol address locally in the data processing system in a database of Internet Protocol translations when the page is requested for the first time, wherein the Internet Protocol address for the page is stored in association with the domain name for the page and wherein the database is accessible only by the client application and used by the client application in a subsequent request for the page;

referencing means, responsive to a request for a selected page, for referencing the database of Internet Protocol translations to determine whether an Internet Protocol address for a selected page is present;

requesting means for requesting the selected page with the subsequent request, wherein the subsequent request uses an Internet Protocol address returned from the database of Internet Protocol translations if the Internet Protocol address is present in the database of Internet Protocol translations;

querying means for querying the remote domain name server to determine the Internet Protocol address of the selected page if the Internet Protocol address for the selected page cannot be determined from referencing the database of Internet Protocol translations; and performing means for performing the looking and using steps only if a selected user input is received, wherein the selected user input requests that a local translation process is skipped.

7. The data processing system of claim 6 further comprising:

indicating means for indicating in the database of Internet Protocol translations that certain Internet Protocol addresses of specified domain names are to be excluded from the database.

8. The data processing system of claim 6 further comprising:

updating means for updating the database of Internet Protocol translations, by a client application, if a given Internet Protocol address for a given domain name has changed.

9. The data processing system of claim 6 further comprising:

receiving means for automatically receiving an updated Internet Protocol address for a given domain name if a given Internet Protocol address for the given domain name has changed.

10. A computer program product in a computer readable medium for requesting a page from a server across a network data processing system, the computer program product comprising:

first instructions for requesting, by a client application in the data processing system, the page for a first time, wherein the page is requested using a domain name and wherein the first instructions for requesting forms a first request;

second instructions for looking up an Internet Protocol address for the domain name for the page on a remote domain name server;

third instructions for using the Internet Protocol address to request the page;

fourth instructions for storing the Internet Protocol address locally in the data processing system in a database of Internet Protocol translations when the page is requested for the first time, wherein the Internet Protocol address for the page is stored in association with the domain name for the page and wherein the database is accessible only by the client application and used by the client application in a subsequent request for the page;

fifth instructions, responsive to a request for a selected page, for referencing the database of Internet Protocol translations to determine whether an Internet Protocol address for a selected page is present;

sixth instructions for requesting the selected page with the subsequent request, wherein the subsequent request uses an Internet Protocol address returned from the database of Internet Protocol translations if the Internet Protocol address is present in the database of Internet Protocol translations;

seventh instructions for querying the remote domain name server to determine the Internet Protocol address of the selected page if the Internet Protocol address for the selected page cannot be determined from referencing the database of Internet Protocol translations; and eighth instructions for performing the looking and using steps only if a selected user input is received, wherein the selected user input requests that a local translation process is skipped.

* * * * *